United States Patent
Wahlquist et al.

(10) Patent No.: US 10,357,949 B2
(45) Date of Patent: Jul. 23, 2019

(54) MELTBLOWN-SPUNBONDED-MELTBLOWN LAMINATED FABRIC

(71) Applicants: Joseph D. Wahlquist, Kohler, WI (US); Michael Edward Huss, Chilton, WI (US); Patrick T. Heery, High Point, NC (US); John P. Field, Leland, NC (US)

(72) Inventors: Joseph D. Wahlquist, Kohler, WI (US); Michael Edward Huss, Chilton, WI (US); Patrick T. Heery, High Point, NC (US); John P. Field, Leland, NC (US)

(73) Assignees: Rockline Industries, Inc., Sheboygan, WI (US); Fiber Dynamics, Inc., High Point, NC (US)

(*) Notice: Subject to any disclaimer, the term of this patent is extended or adjusted under 35 U.S.C. 154(b) by 476 days.

(21) Appl. No.: 15/270,766

(22) Filed: Sep. 20, 2016

(65) Prior Publication Data

US 2017/0008265 A1    Jan. 12, 2017

Related U.S. Application Data

(62) Division of application No. 13/585,907, filed on Aug. 15, 2012, now Pat. No. 9,498,939.

(51) Int. Cl.
*B27N 3/00* (2006.01)
*B32B 17/00* (2006.01)
(Continued)

(52) U.S. Cl.
CPC .......... *B32B 37/0084* (2013.01); *A47L 13/16* (2013.01); *B32B 3/263* (2013.01);
(Continued)

(58) Field of Classification Search
CPC ......... B29C 65/02; B29C 65/18; B29C 66/41; B29C 66/43; B29C 66/71; B29C 66/7294;
(Continued)

(56) References Cited

U.S. PATENT DOCUMENTS

| 5,219,633 A | 6/1993 | Sabee |
| 5,336,545 A | 8/1994 | Morman |

(Continued)

FOREIGN PATENT DOCUMENTS

| EP | 0474123 A1 | 3/1992 |
| EP | 0924328 A1 | 6/1999 |

(Continued)

OTHER PUBLICATIONS

Hegde, Raghavendra R. et al.; "Biconnponent Fibers"; http://web.utk.edu/~mse/Textiles/Bicomponent%20fibers.htm; Jul. 5, 2012.

*Primary Examiner* — Philip C Tucker
*Assistant Examiner* — Brian R Slawski
(74) *Attorney, Agent, or Firm* — Reinhart Boerner Van Deuren P.C.

(57) ABSTRACT

There is disclosed a laminated, nonwoven fabric and a process for producing such a laminated, nonwoven fabric having desirable fluid holding and fluid release characteristics. The process provides that two sheets of meltblown fiber fabric are produced on forming wire assemblies, cooled at a cooling area, and are then laminated on opposite sides of a sheet of spunbonded fibers using to form the laminated, nonwoven fabric.

8 Claims, 3 Drawing Sheets

(51) Int. Cl.

| | | |
|---|---|---|
| *D04H 13/00* | (2006.01) | |
| *D04H 3/16* | (2006.01) | |
| *B32B 5/00* | (2006.01) | |
| *B32B 29/02* | (2006.01) | |
| *D04H 3/08* | (2006.01) | |
| *B29C 59/04* | (2006.01) | |
| *B31F 1/07* | (2006.01) | |
| *B60J 10/00* | (2016.01) | |
| *B29C 65/00* | (2006.01) | |
| *B32B 37/00* | (2006.01) | |
| *C08J 5/00* | (2006.01) | |
| *B65C 9/25* | (2006.01) | |
| *B32B 5/26* | (2006.01) | |
| *B32B 27/14* | (2006.01) | |
| *D04H 5/06* | (2006.01) | |
| *D04H 5/08* | (2012.01) | |
| *B32B 5/02* | (2006.01) | |
| *B32B 3/26* | (2006.01) | |
| *B32B 3/30* | (2006.01) | |
| *A47L 13/16* | (2006.01) | |
| *D04H 1/559* | (2012.01) | |
| *D04H 1/56* | (2006.01) | |
| *B29C 65/18* | (2006.01) | |

(52) U.S. Cl.
CPC ............... *B32B 3/30* (2013.01); *B32B 5/022* (2013.01); *B32B 5/26* (2013.01); *D04H 1/559* (2013.01); *D04H 1/56* (2013.01); *D04H 5/06* (2013.01); *D04H 5/08* (2013.01); *B29C 65/18* (2013.01); *B29C 66/43* (2013.01); *B29C 66/71* (2013.01); *B29C 66/7294* (2013.01); *B32B 2250/03* (2013.01); *B32B 2250/20* (2013.01); *B32B 2250/40* (2013.01); *B32B 2262/0253* (2013.01); *B32B 2305/20* (2013.01); *B32B 2307/554* (2013.01); *B32B 2307/584* (2013.01); *B32B 2307/726* (2013.01); *B32B 2432/00* (2013.01); *Y10T 428/24612* (2015.01); *Y10T 428/24826* (2015.01); *Y10T 442/609* (2015.04); *Y10T 442/66* (2015.04)

(58) Field of Classification Search
CPC ... B32B 5/26; B32B 5/022; B32B 2262/0253; B32B 2250/40; B32B 2250/20; B32B 2305/20; D04H 1/56; D04H 1/565; D04H 1/559; D04H 3/14; D04H 3/16; D01D 5/0985
USPC ... 156/60, 62.2, 62.4, 62.6, 62.8, 73.1, 73.2, 156/166, 167, 169, 172, 173, 174, 175, 156/176, 177, 178, 179, 180, 181, 196, 156/199, 209, 219, 220, 221, 290, 308.2, 156/308.4, 324; 442/381, 382, 392; 428/198

See application file for complete search history.

(56) References Cited

U.S. PATENT DOCUMENTS

| | | |
|---|---|---|
| 5,429,854 A | 7/1995 | Currie et al. |
| 5,492,751 A | 2/1996 | Butt, Sr. et al. |
| 5,560,794 A | 10/1996 | Currie et al. |
| 5,683,794 A | 11/1997 | Wadsworth et al. |
| 5,883,026 A | 3/1999 | Reader et al. |
| 6,182,732 B1 | 2/2001 | Allen |
| 6,187,699 B1 | 2/2001 | Terakawa et al. |
| 6,369,292 B1 | 4/2002 | Strack et al. |
| 6,632,386 B2 | 10/2003 | Shelley et al. |
| 7,037,569 B2 | 5/2006 | Curro et al. |
| 9,498,939 B2 | 11/2016 | Wahlquist et al. |
| 2002/0189748 A1* | 12/2002 | Allen ............... B32B 5/26 156/167 |
| 2004/0116990 A1 | 6/2004 | Agarwal et al. |
| 2006/0084343 A1 | 4/2006 | Bonneh |
| 2006/0148358 A1 | 7/2006 | Hall et al. |
| 2010/0196672 A1* | 8/2010 | Bonneh ............ B32B 7/08 428/174 |

FOREIGN PATENT DOCUMENTS

| | | |
|---|---|---|
| JP | H071631819 A | 6/1995 |
| WO | WO 94/28224 A1 | 12/1994 |

\* cited by examiner

MELTBLOWN-SPUNBONDED-MELTBLOWN LAMINATED FABRIC

CROSS-REFERENCE TO RELATED PATENT APPLICATIONS

This patent application is a Divisional of U.S. patent application Ser. No. 13/585,907, filed Aug. 15, 2012, now U.S. Pat. No. 9,498,939, the entire teachings and disclosure of which are incorporated herein by reference thereto.

BACKGROUND OF THE INVENTION

Field of the Invention

This invention relates generally to laminated, nonwoven fabric and to methods of manufacturing such fabric, and more particularly to laminated nonwoven fabric having desirable fluid holding and fluid release characteristics.

Spunbonded and meltblown nonwoven fabric technology has been in commercial practice since the 1960's. The practice of laminating meltblown fibers or fabric onto a layer of spunbonded polymer fabric to create a fabric with barrier properties, or an absorbent fabric with higher strength, was developed in the 1970's.

Spunbonded fabric is a nonwoven fabric made by extruding molten polymer (usually polypropylene, but other polymers are possible) through fine holes in a spinneret and then attenuating or drawing them to orient the polymer molecules and create high fiber tenacity. The fibers are formed onto a moving wire and then thermally fused together with a patterned calendar. The spunbonded filaments are continuous in nature and have a typical diameter of 15 to 35 microns. The resulting spunbonded fabric has high strength, but the large open capillaries formed by the large spunbonded filaments result in poor wicking properties and in a liquid delivery curve that is very fast and streaky.

Meltblown fabric is a nonwoven fabric produced by extruding molten polymer (usually polypropylene, but other polymers are possible) through very small holes in a die tip. The molten polymer is drawn into fiber form using high velocity hot air and sprayed onto a forming wire. The attenuation or stretching of the meltblown fibers is far less than that of spunbonded technology, so the resulting meltblown fibers have significantly less tenacity than typical spunbonded filaments. Meltblown fiber length typically varies between 12 and 100 mm, and meltblown fiber diameter can vary depending on extruding conditions, but is typically in the range of 2 to 5 microns for wiping and absorbent applications. The resulting meltblown fabric is weaker than spunbonded fabric, but the fine capillary structure formed by the smaller meltblown fibers gives the meltblown fabric excellent wicking characteristics and a high degree of direct fiber to surface contact with a surface to be cleaned. Meltblown fabric releasing its liquid more slowly and uniformly over a larger area than does a spunbonded fabric.

In the 1970's, a process was developed to laminate layers of spunbonded fibers and meltblown fibers together. The process formed a layer of spunbonded fibers onto a wire, then sprayed a layer of meltblown fibers onto the first layer of spunbonded fibers, and then sprayed another layer of spunbonded fibers onto the second layer of meltblown fibers, resulting in a spunbonded/meltblown/spunbonded fabric having the meltblown fibers sandwiched between spunbonded fibers. This structure was further thermally bonded together using a heated patterned embossing roll to melt discrete points on the fabric through the entire thickness thereof. The resulting fabric had good barrier properties provided by the internal layer of meltblown fibers and good strength and abrasion resistance from the outer layers of spunbonded fibers. The primary application for this technology has been as a barrier fabric for medical and infant care (e.g., to prevent leaks from diapers). Such spunbonded-meltblown-spunbonded compositions exhibit poor absorption capacity. The outer layers of the large capillary spunbonded fabrics do not make an effective wipe because of poor absorption capacity, and the outer spunbonded fibers do not provide uniform solution release because the large spunbonded fibers have only a small contact area with a surface to be treated, and resulting in a streaky, non-uniform delivery.

Meltblown-spunbonded-meltblown laminates have also been made in limited quantities by spraying meltblown fibers directly onto a layer of spunbonded fibers. The small size of the meltblown fibers combined with the high velocity forming air and underwire vacuum cause the meltblown fibers to fill in most of the large, open void spaces in the spunbonded fibers rather than simply laying on the top of the spunbonded fibers. Such fabrics were designed, sold, and used in dry form to wipe up liquids, rather than for the delivery of a liquid lotion to a surface.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

There is disclosed a laminated, nonwoven fabric having desirable fluid delivery and/or fluid retention characteristics. The fabric is composed of two discrete layers of meltblown fibers and a layer of spunbonded fibers with the first and second layers of meltblown fibers sandwiching the layer of spunbonded fibers. By laminating the discrete layers of meltblown fibers on opposite sides of the layer of spunbonded fibers it has been found that the large void spaces in the central layer of spunbonded fibers were kept open rather than filled in previously known processes which deposited meltblown fibers directly onto a layer of spunbonded fibers.

The first and second layers of meltblown fibers are composed of polymer fibers having a preselected fiber diameter range, with the first and second layers of meltblown fibers being cooled to a temperature below the melting point of the polymer. Thus, the meltblown layers are fully formed and cooled before they are laminated on opposite sides of the layer of spunbonded fibers. The layer of spunbonded fibers is composed of either unbounded polymer fibers or thermal bonded polymer fibers in either case having a preselected fiber diameter range substantially larger than the fiber diameters of the first layer of meltblown fibers. The layer of spunbonded fibers is also cooled to a temperature below the melting point of the polymer.

The layer of spunbonded fibers is disposed between the first and second layers of meltblown fibers with the three layers then being integrated into a single laminated, nonwoven fabric on a thermal calendar apparatus. The laminated, nonwoven fabric has desirable fluid holding effectiveness characteristics and fluid delivery uniformity characteristics.

In a preferred embodiment, the polymers used for the first and second layers of meltblown fibers and the layer of spunbonded fibers may be the same (typically polypropylene). However, even if the same polymer is used for both the first and second layers of meltblown fibers and the layer of spunbonded fibers, different molecular weights of the polymer may be used to control the meltflow in each process, with the molecular weight of the polymer used for the layer of spunbonded fibers typically being greater than the molecular weight of the polymer used for the layers of meltblown fibers. In one embodiment, the preselected diameter range of the fibers in the meltblown layers is about 0.5 microns to about 10.0 microns inclusive. In another embodiment, the preselected diameter range of the fibers in the meltblown layers is between about 2.0 microns to about 5.0 microns inclusive.

In an alternate embodiment, a laminated, nonwoven fabric may include a first layer of meltblown fibers and a second layer of meltblown fibers is disclosed with the two layers integrated into a single laminated, nonwoven fabric. Each of the first and second layers of meltblown fibers each have one surface arranged and configured to define a three-dimensional pattern. The first and second layers of meltblown fibers are cooled to a temperature below the melting point of the polymer.

The two layers of meltblown fibers are integrated into a single layer laminated, nonwoven fabric on a thermal calendar apparatus with the respective three-dimensional surfaces of the two layers of meltblown fibers facing each. The resulting laminated, nonwoven fabric has desirable fluid holding effectiveness characteristics and fluid delivery uniformity characteristics.

In variation of this embodiment, the laminated, nonwoven fabric may have the first layer's three-dimensional pattern offset from the second layer's three dimensional pattern when the two layers pass through the bonding calendar.

Another embodiment includes first and second layers of meltblown fibers including a first group of fibers having a first fiber diameter range on one side thereof and a second group of fibers having a second diameter range on the opposite side thereof larger than the first diameter range. The first and second layers of meltblown fibers are cooled at a temperature below the melting point of both polymers.

The two layers of are integrated into a single layer of laminated, nonwoven fabric with the sides of the two layers having the larger diameter fibers facing each other. After moving through a thermal calendar apparatus, the resulting laminated, nonwoven fabric has desirable characteristics of fluid holding effectiveness and fluid delivery uniformity.

The apparatus of the present invention is of a construction which is both durable and long lasting, and which will require little or no maintenance to be provided by the user throughout its operating lifetime. Finally, all of the aforesaid advantages and objectives are achieved without incurring any substantial relative disadvantage.

DESCRIPTION OF THE DRAWINGS

These and other advantages of the present disclosure are best understood with reference to the drawings, in which.

DETAILED DESCRIPTION OF THE EXEMPLARY EMBODIMENTS

There is disclosed herein a method of laminating two layers of meltblown polymer fibers to a layer of spunbonded polymer fibers on opposite sides thereof in such a way as to create unique and unexpected solution retention and delivery characteristics for wet wiping and solution delivery applications and fluid retention fabrics. A general description of this method and the resulting product will be provided prior to discussing the specific method, which will follow.

To obtain the advantageous solution retention and delivery characteristics in a meltblown-spunbonded-meltblown laminate and thereby avoid the type of problems in laminated fabrics described above, the present invention has each of the three layers produced independently and cooled before lamination. In other words, the two layers of meltblown fibers are each extruded onto a forming wire assembly and cooled, and the layer of spunbonded fibers is extruded onto a forming wire assembly and cooled. Thus, all three layers are at a temperature below the melting point of the polymer material before they are brought together in a laminating process.

The two layers of meltblown fibers and the layer of spunbonded fibers located therebetween is laminated into a laminated, nonwoven fabric by running the "sandwich structure" of the meltblown-spunbonded-meltblown layers through a heated calendar system, where one of the rollers of the calendar system typically has a smooth surface and the other roller typically has heated pins. Alternately, one of the rollers of the calendar system can include an engraved three dimensional raised surface that will impart a three-dimensional pattern onto the laminated, nonwoven fabric. Another alternative is that a three-dimensional forming-wire pattern may be used to impart a three-dimensional structure to the layers of meltblown fibers used to form the laminated, nonwoven fabric.

In the disclosed processes, the meltblown-spunbonded-meltblown ("MSM") "sandwich" passes between the rollers of the calendar system. Heat and pressure are applied by the rolls to melt the materials of the layers together in the areas of the raised pins, thereby creating strength and abrasion resistance, but leaving most of the fabric in fibrous form to optimize void volume and capillary action between the two layers of meltblown fibers. This construction also improves the drapability and the softness of the resulting laminated, nonwoven fabric 102.

The resulting laminated, nonwoven fabric has advantageous fluid retention and fluid delivery uniformity characteristics. The laminated, nonwoven fabric of the present invention was tested against a pure meltblown fabric, with both in the form of wipes. In the test, the solution release characteristic of 34 gsm (grams per square meter) meltblown-spunbonded-meltblown structure laminated, nonwoven fabric wipe (12 gsm meltblown, 10 gsm spunbonded, 12 gsm meltblown) and pure 34 gsm meltblown fabric wipe were compared (it will be appreciated that this weight fabric is an example and that other weights of fabric may also be manufactured according to the teachings of the present invention.). Both wipes were saturated with lotion to a solution load of 478% and placed under a 600 gram sled having a 3.5 inch×6 inch footprint. The sled was pulled along a smooth, nonporous surface for 60 inches resulting in a 2.5 sq. foot coverage. The sled and wipe were then weighed to determine the amount of solution delivered to the surface. This procedure was repeated 19 times for each wipe tested.

Below is a table showing the results of the average three tests performed as described above.

| PASS | 34 GSM MELTBLOWN | | 34 GSM MSM | |
| --- | --- | --- | --- | --- |
| | AVE/ PASS | AVE CUM | AVE/ PASS | AVE CUM |
| 1 | 0.49 | 0.49 | 0.91 | 0.91 |
| 2 | 0.29 | 0.78 | 0.48 | 1.38 |
| 3 | 0.24 | 1.02 | 0.24 | 1.63 |
| 4 | 0.17 | 1.19 | 0.17 | 1.80 |
| 5 | 0.13 | 1.33 | 0.14 | 1.94 |
| 6 | 0.13 | 1.45 | 0.12 | 2.06 |
| 7 | 0.11 | 1.57 | 0.10 | 2.16 |
| 8 | 0.10 | 1.67 | 0.07 | 2.23 |
| 9 | 0.07 | 1.74 | 0.09 | 2.32 |
| 10 | 0.09 | 1.82 | 0.08 | 2.40 |
| 11 | 0.08 | 1.91 | 0.05 | 2.45 |
| 12 | 0.06 | 1.97 | 0.06 | 2.51 |
| 13 | 0.05 | 2.02 | 0.06 | 2.57 |
| 14 | 0.06 | 2.08 | 0.08 | 2.65 |
| 15 | 0.07 | 2.15 | 0.03 | 2.68 |
| 16 | 0.03 | 2.18 | 0.04 | 2.72 |
| 17 | 0.04 | 2.22 | 0.05 | 2.77 |
| 18 | 0.04 | 2.27 | 0.04 | 2.81 |
| 19 | 0.04 | 2.30 | 0.04 | 2.85 |

Applicants, unexpectedly found that by keeping the large void spaces open in the central layer of spunbonded fibers, they were able to effectively trap solution in the large capillaries formed by the spunbonded fibers between the layers of the fine fiber meltblown fibers on the outer surface. Applicants found that the fabric released lotion faster than a fabric made of only fine fiber meltblown fabric and much more uniformly than a spunbonded fiber fabric or a lamination of spunbonded-meltblown-spunbonded fiber fabric. Applicants also found that a greater total solution delivery was achieved and a greater area coverage was demonstrated by using the meltblown-spunbonded-meltblown fabric as compared to the pure meltblown fabric as exhibited in the above table.

The data shows that the MSM fabric delivers an average of 86% more solution on the first pass and 60% more solution after three passes than pure meltblown fabric of the same weight. This faster solution release is critical for passing many of the new efficacy tests required by the Environmental Protection Agency for hard surface disinfectants. The data also shows that the MSM fabric released a total of 24% more total solution over the 19 passes. This attribute is critical for performance of a wet wipe because it increases the area that a wipe can effectively treat and also increases how effectively the wipe can utilize its solution loading.

Applicants disclose that the improved performance of the MSM can be explained by the theory of capillary action. Capillary action is defined as "the movement of the liquid along the surface of a solid caused by the adhesion or attraction of molecules of the liquid to the molecules of a solid." This theory predicts that liquid will wick faster and be held onto more tightly as pore size decreases and as the ratio of solid surface area to liquid increases. The large open pores (capillaries) and the relatively low surface area created by the center spunbonded layer of the laminated, nonwoven fabric of the present invention is capable of holding a large volume of liquid but gives the liquid up very easily under the pressure that is exerted during the wiping process. This theory also predicts that the large surface area and small capillaries formed by the outer layers of meltblown fabric tend to hold onto liquid more tightly.

The solution release (sled) testing described above confirmed that the MSM fabric allowed the liquid to be expressed faster and more completely than did a pure meltblown fabric of the same weight. The outer layers of meltblown fabric with small capillaries and high surface areas, maximized contact with the hard surface being treated, which resulted in a very uniform layer of solution being laid down.

Although meltblown-spunbonded-meltblown laminates have been produced in the past, they have mainly been used as a dry wipe. In such previously known processes of making such wipes, the meltblown fibers are sprayed directly onto a layer of the spunbonded fibers. The small size of the meltblown fibers combined with the high velocity forming air and underwire vacuum caused the meltblown fibers to flow into and fill many of the large, open void spaces in the spunbonded fiber layer rather than simply laying on top of the spunbonded fibers. As a result of these large, open void spaces in the spunbonded fiber layer being filled by the meltblown fibers, such MSM laminates are not effective to retain or hold a fluid.

The laminated, nonwoven MSM fabric of the present invention avoids such problems by cooling each of the layers prior to joining them into the laminated, nonwoven MSM fabric. By cooling the meltblown fiber layers and the spunbonded fiber layer individually and separately before they are brought together in the laminating process, the inner layer of spunbonded fibers retains its optimized void volume and capillary action to provide the appropriate fluid holding effectiveness and fluid delivery uniformity characteristics desired, as well as maintaining the drapability and softness of the resulting fabric. As mentioned above, the calendar assembly only heats (melts) the portions of the three layers where the pins of the calendar roller contacts the meltblown-spunbonded-meltblown laminate. Thus, large areas of fiberto-fiber intersections are avoided, and the void volume of the spunbonded fabric is maintained.

Figure 1:
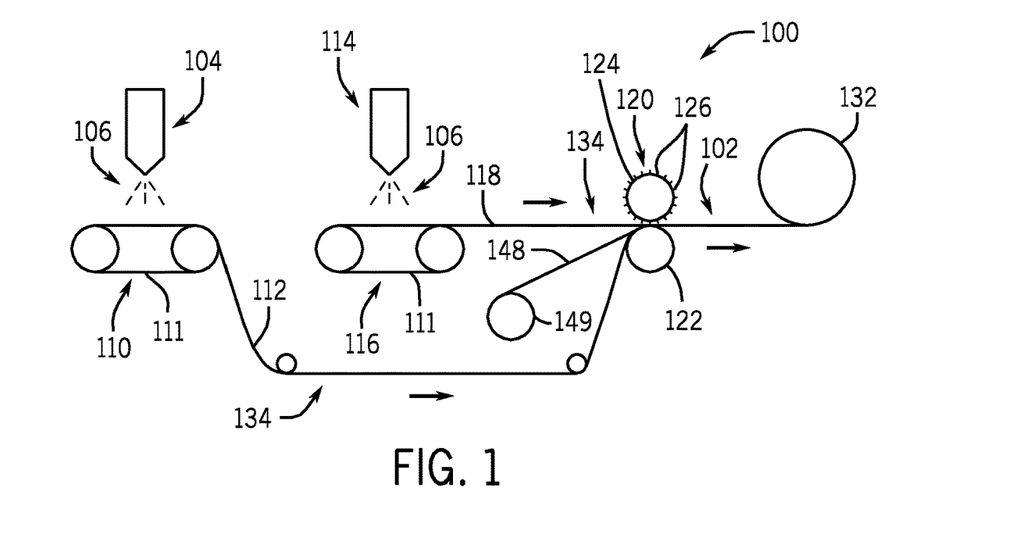
FIG. 1 is a schematic diagram of a preferred embodiment process to produce a laminated, nonwoven fabric by laminating a layer of spunbonded fabric between two layers of meltblown fibers.

Referring now to the FIG. 1, a process 100 is disclosed in which a laminated, nonwoven fabric 102 is produced. The process 100 provides that two individual layers or sheets of meltblown fibers, namely a first layer 112 and a second layer 118, are respectively produced on two forming wire assemblies 110 and 116, are respectively cooled at two cooling areas 134, and are then laminated onto opposite sides of a central layer or sheet of spunbonded fibers 148 using a patterned thermal calendar apparatus 120.

The first layer 112 of meltblown fibers is composed of a polymer 106, for example a homopolymer polypropylene ("PP") having a melting point temperature. The first layer 112 of meltblown fibers has a preselected fiber diameter range between about 0.5 microns and about 10 microns, with the majority of fibers having a diameter range of between about 2.0 microns and about 5.0 microns. Such size optimizes cost, liquid holding effectiveness, and liquid application uniformity of the resulting laminated, nonwoven fabric 102. The diameter size of the meltblown fibers are produced by the nozzles in extruders 104 and 114, and may be varied as required by the user based upon the intended application.

The first layer 112 is extruded from a first extruder 104 as polymer fibers 106 onto a first forming wire assembly 110 which includes a forming wire 111. The forming wire 111 may optionally be configured to have a three-dimensional pattern as determined by the user. The resulting first layer 112 then passes through the cooling area 134 to reduce the temperature of the first layer 112 of meltblown fiber polymer to a temperature below the melting point of the polymer. The cooling area 134 may be a mechanical refrigeration apparatus, a series of fans, ambient air passing over the first layer 112, or any other mechanism for reducing the temperature of the first layer. A second layer 118 of meltblown fibers is extruded from a second extruder 114 and may be composed of the same polymer fibers 106 having the same fiber diameter range as the fibers in the first layer 112 of meltblown fibers. The second layer 118 of meltblown fibers is also cooled at a temperature below the melting point of the polymer 106 in another cooling area 134 as described above.

A layer 148 of spunbonded fibers composed of a thermoplastic polymer 108 (such as homopolymer polypropylene) is supplied from a supply roll 149. The layer 148 of spunbonded fibers is composed of a preselected fiber diameter range that is larger than the fiber diameter range of the first and second layers 112 and 118 of meltblown fibers. The typical diameter of the fibers of the spunbonded layer 148 is in the range of about 15 microns to about 35 microns. Such a large diameter, relative to the meltblown fiber diameter, creates an optimized void volume and capillary action in the layer 148 of spunbonded fibers. As illustrated in FIG. 1, the layer of spunbonded fibers 148 is disposed between the first and second meltblown fiber layers 112 and 118, with the three layers 112, 148, and 118 being integrated into a single laminated, nonwoven fabric 102 which is then passed through a heated calendar apparatus 120.

As the three cooled polymer layers 112, 148, and 118 of pass through the thermal calendar apparatus 120 between a pin roller 124 and a smooth calendar roller 122, pins 126 located on a pin roller 124 extend into the three layers 112, 148, and 118 to bond the three layers into the single laminated, nonwoven fabric 102. The smooth calendar roller 122 and the pin roller 124 apply both pressure and heat to the layers 112, 148, and 118 passing through the calendar apparatus 120. The bond area of the thermal laminating calendar 120 is typically between 1% and 50% of the total area of the laminated layers with the preferred bonding area being between 5% and 20% of the laminated layer area. Such a limited bonding area optimizes the balance of void volume, the softness, the strength, the ply attachment, the abrasion resistance, and the contact area with the hard surface to be treated by the resulting laminated, nonwoven fabric 102. Upon exiting the calendar apparatus 120 the laminated, nonwoven fabric 102 is wound on a take-up winder 132 and then moved on for further processing.

In a preferred embodiment, the outer meltblown layers 112 and 118 and the center layer 148 of spunbonded fabric are made out of similar miscible materials (for example polypropylene meltblown and polypropylene spunbonded fibers) to maximize the thermal bonding effectiveness. However, non-miscible materials could also be used, but ply attachment typically would be reduced as a result.

Figure 2:
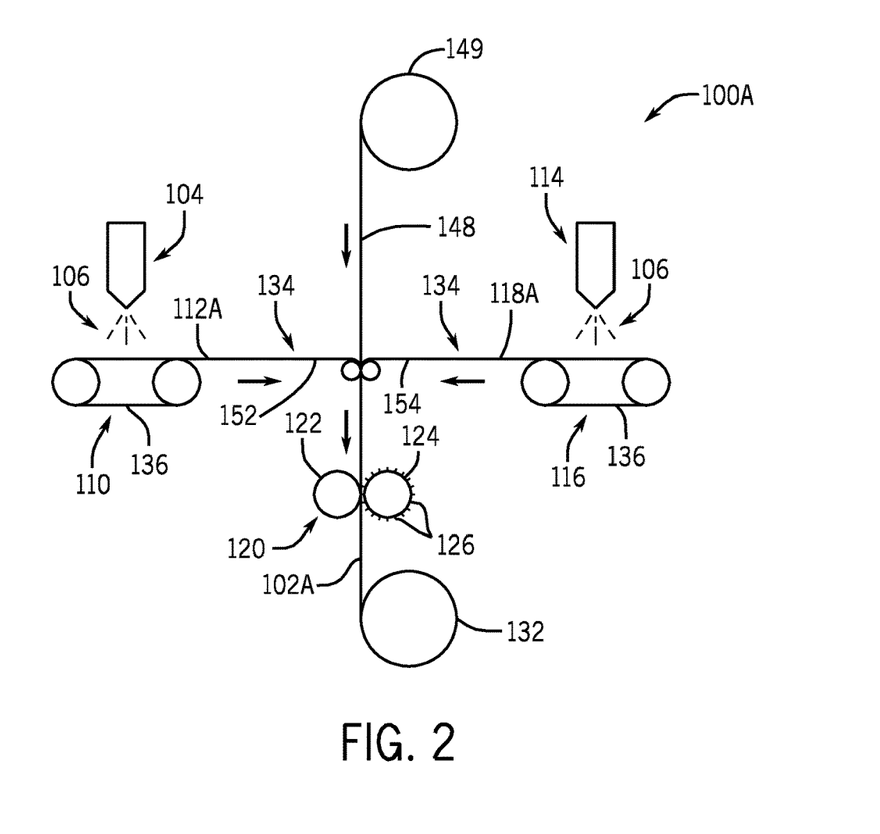
FIG. 2 is a schematic diagram of the process illustrated in FIG. 1, including a pair of three-dimensional forming-wire assemblies producing each of the two layers of meltblown fibers, with a surface of each meltblown layer opposite the tree-dimensional side being in contact with the spunbonded fiber layer.

Referring now to FIG. 2, a process 100A is illustrated that is similar to the process 100 shown in FIG. 1, in which similar elements are provided with the same reference numerals. In the process 100A, the forming wire assembly 110 and the forming wire assembly 116 include 3D forming wires 136 that include a three-dimensional pattern designed to impart a three-dimensional surface into the first and second meltblown layers 112A and 118A, respectively, that will form the outer surfaces of a laminated, nonwoven fabric 102A. When the meltblown polymer 106 is extruded onto the forming wires 136 in the forming wire assemblies 110 and 116 through the extruders 104 and 114, respectively, at least a first surface 152 of the first layer 112A of meltblown fibers and at least a first surface 154 of the second layer 118A of meltblown fibers each define a three dimensional pattern. The layers 112A and 118A of meltblown fibers are each cooled in a cooling area 134.

Figure 5:
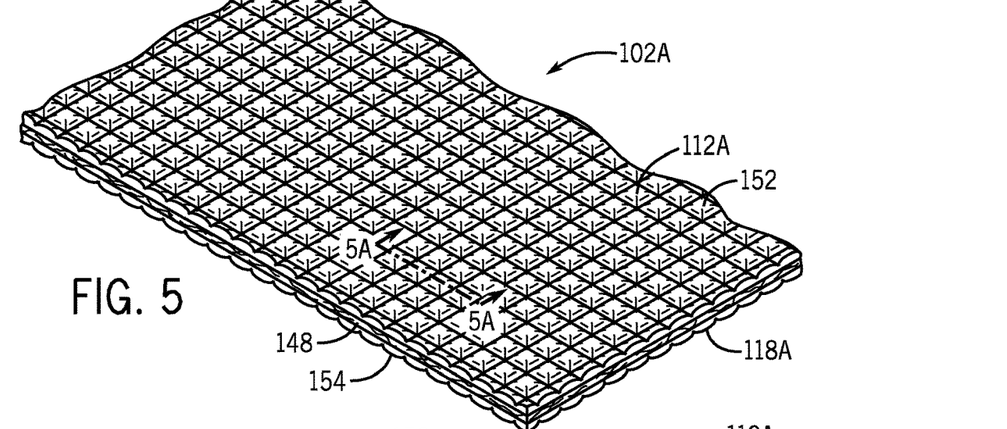
FIG. 5 is an exemplary embodiment of a fabric produced with the process illustrated in FIG. 2 after the spunbonded layer is disposed between the two meltblown layers.
Figure 5A:
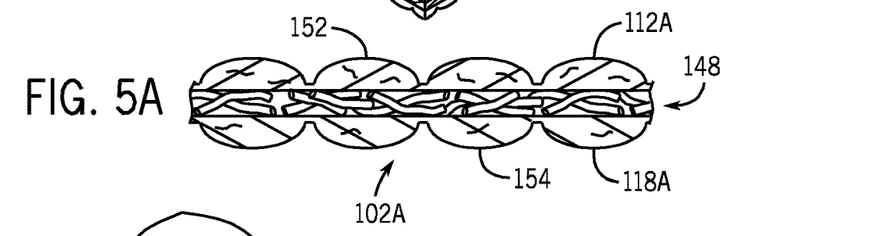
FIG. 5A is a cross-sectional schematic view of the fabric illustrated in FIG. 5 along the line 5A-5A.

A layer 148 of spunbonded fibers is supplied from a supply roll 149 and is fed between the two layers 112A and 118A with the three dimensional patterns and all three layers pass through the calendar apparatus 120, with the three-dimensional patterns of the surfaces 152 and 154 respectively defining the outer surfaces of the laminated, nonwoven fabric 102A. The smooth calendar roller 122 and the pin roller 124 with pins 126 extending into the three layers 112A, 148, and 118A bonds the three layers into the single laminated, nonwoven fabric 102A. The smooth calendar roller 122 and the pin roller 124 apply both pressure and heat to the layers 112A, 148, and 118A passing through the calendar apparatus 120. See FIGS. 5 and 5A as a schematic example of the resulting fabric 102A. Although not shown in FIGS. 5 and 5A, lotion may be retained in the voids formed in the spunbonded layer 148. It should be understood that the three dimensional pattern can be of any appropriate shape or size.

In other alternate embodiments, the two layers of meltblown fabric are used without a central layer 148 of spunbonded fibers to produce the resulting laminated nonwoven fabric. In this embodiment, the large voids in the center of the finished laminated, nonwoven fabric are produced without using the spunbonded layer. Again, where possible similar reference numerals are used to refer to similar elements wherever possible.

Figure 3:
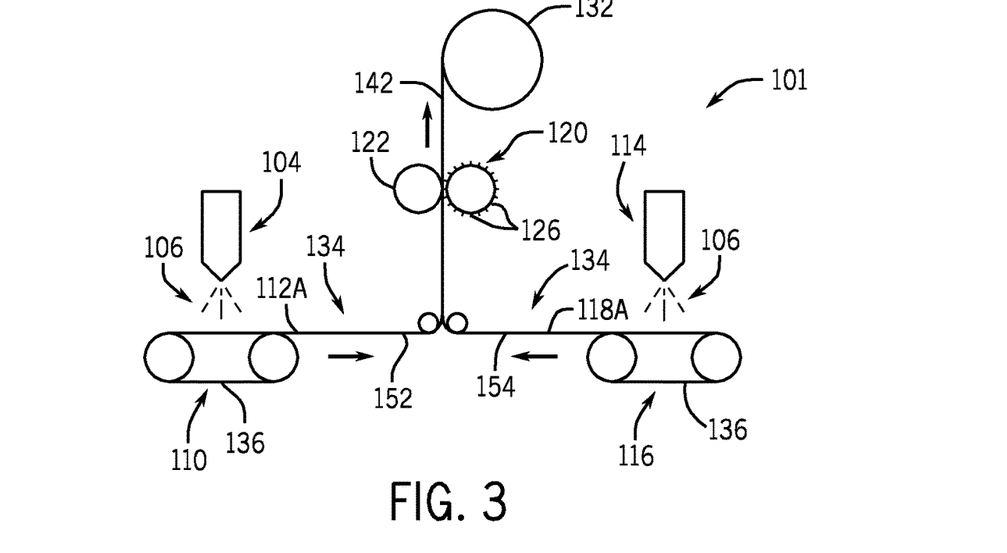
FIG. 3 is a schematic diagram of an alternate embodiment process to produce a laminated, nonwoven fabric by laminating two layers of meltblown fibers together, with the layer of meltblown fibers formed on a three-dimensional forming-wire assembly, with a three-dimensional surface of each meltblown layer in contact with each other.

Referring first to FIG. 3, a process 101 is illustrated that is similar in some respects to the process 100A shown in FIG. 2. In the process 101, the forming wire assembly 110 and the forming wire assembly 116 include 3D forming wires 136 that include a three-dimensional pattern designed to impart a three-dimensional surface in the first and second meltblown layers 112A and 118A, respectively, that will form the inner surfaces of a laminated, nonwoven fabric 142. When the meltblown polymer 106 is extruded onto the forming wires 136 in the forming wire assemblies 110 and 116 through the extruders 104 and 114, respectively, at least a first surface 152 of the first layer 112A of meltblown fibers and at least a first surface 154 of the second layer 118A of meltblown fibers each define a three dimensional pattern. The layers 112A and 118A of meltblown fibers are each cooled in a cooling area 134.

The two layers 112A and 118A with the three dimensional patterns facing each other to create void volume then pass through the calendar apparatus 120, with the three-dimensional patterns of the surfaces 152 and 154 respectively defining the outer surfaces of the laminated, nonwoven fabric 142. The smooth calendar roller 122 and the pin roller 124 with pins 126 extending into the two layers 112A and 118A bonds the two layers into the single laminated, nonwoven fabric 142, with large voids inside formed by the facing three-dimensional patterns in the layers 112A and 118A. The smooth calendar roller 122 and the pin roller 124 apply both pressure and heat to the layers 112A and 118A passing through the calendar apparatus 120.

Figure 6:
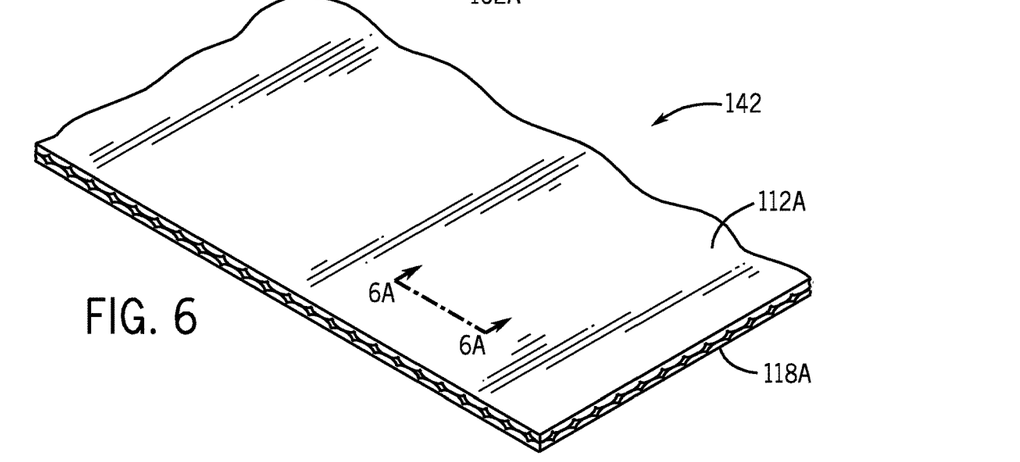
FIG. 6 is an exemplary embodiment of a fabric produced with the process illustrated in FIG. 3 after the two meltblown layers are laminated together.
Figure 6A:
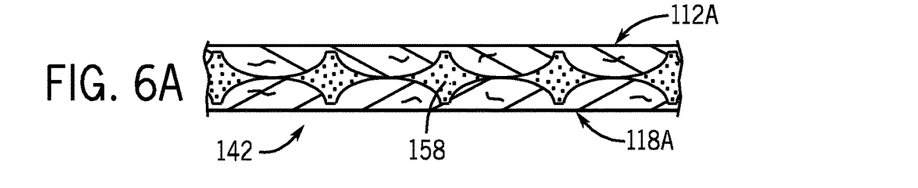
FIG. 6A is a cross-sectional schematic view of the fabric illustrated in FIG. 6 along the line 6A-6A.

As illustrated in FIGS. 6 and 6A, the three dimensional pattern on each of the first layer 112A and second layer 118A of the meltblown fibers include peaks or shapes which may be lined up with each other during the laminating process to maximize the internal void volume of the resulting fabric 142. In other embodiments, the three dimensional pattern of peaks and valleys on one of the layers of meltblown fabric 112A may be orientated 90 degrees with respect to the three dimensional pattern on the second layer of meltblown fabric 118A. When the three dimensional sides of the meltblown layers 112 and 118 are laminated together the corresponding peaks and valleys align to maximize the internal void volume of the fabric 102. As illustrated in FIG. 6A, lotion 158 may be retained in the voids formed by the above-described process.

Figure 4:
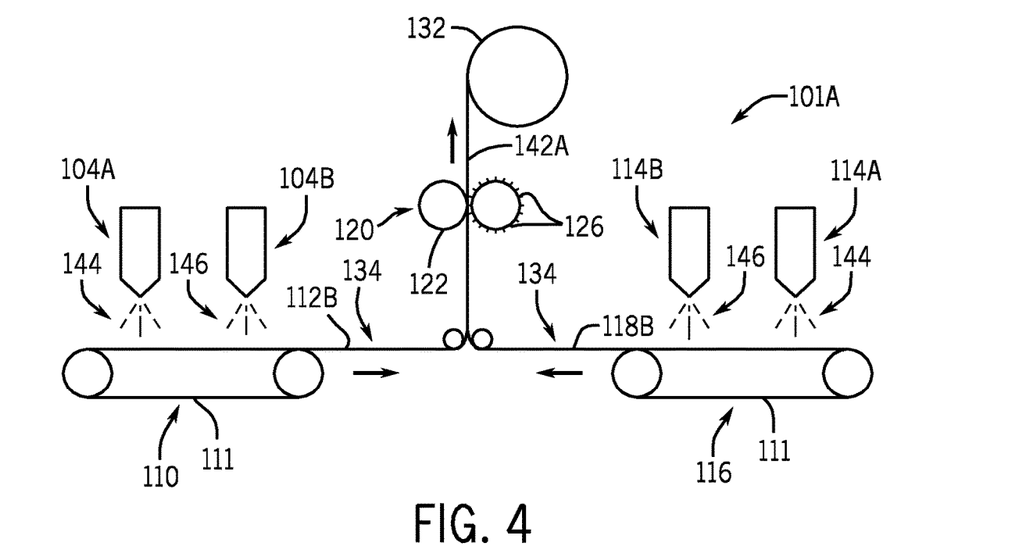
FIG. 4 is a schematic diagram of an alternate embodiment process to produce a laminated, nonwoven fabric by laminating two layers of meltblown fibers together, with each layer configured with a course meltblown fiber applied first to a forming-wire assembly and then a fine meltblown fiber to the wire assembly.

Referring finally to FIG. 4, yet another alternate embodiment depicting a process 101A to form a laminated, nonwoven fabric 142A is disclosed. In the process 101A, a forming wire assembly 110 having a forming wire 111 is used to provide a first layer 112B of meltblown fibers and a forming wire assembly 116 having a forming wire 111 is used to provide a second layer 118B of meltblown fibers. A first size meltblown fiber is extruded from an extruder 104A onto the forming wire 111 on the forming wire assembly 110, and from an extruder 104A onto the forming wire 111 on the forming wire assembly 116. A second size meltblown fiber is extruded from an extruder 104B on top of the first size meltblown fibers on the forming wire 111 on the forming wire apparatus 110 to form the layer 112B of meltblown fibers, and from an extruder 114B on top of the first size meltblown fibers on the forming wire 111 on the forming wire apparatus 116 to form the layer 118B of meltblown fibers.

The first meltblown fiber size extruded from the extruders 104A and 114A preferably has a first preselected fiber diameter range of, for example, about 20 microns to about 40 microns. The second meltblown fiber size extruded from the extruders 104B and 114B preferably has a second preselected fiber diameter range that is smaller than that of the first meltblown polymer, for example, about 0.5 microns to about 5 microns. The first and second size fibers thus form the first layer 112B on the wire forming assembly 110 and a second layer 118B on the wire forming assembly 116. The resulting first layer 112B and the second layer 118B are cooled in cooling areas 134 to a temperature below the melting point of both of the polymers.

The two layers 112B and 118B are integrated into the single laminated, nonwoven fabric 142A with sides of the layers 112B and 118B having the larger fibers located thereupon facing each other, thereby creating large voids in the interior of the laminated, nonwoven fabric 142A and the smaller fibers located on the outside surfaces of the laminated, nonwoven fabric 142A. A calendar apparatus 120 having a smooth calendar roller 122 and a pin roller 124 with pins 126 extending into the two layers 112B and 118B bonds the two layers into the single laminated, nonwoven fabric 142A. The smooth calendar roller 122 and the pin roller 124 apply both pressure and heat to the layers 112B and 118B passing through the calendar apparatus 120.

The resulting single laminated, nonwoven fabric 142A has fluid holding effectiveness and fluid delivery uniformity characteristics. When the two layers 112B and 118B exit the calendar apparatus the larger fibers of each of the layers 112B and 118B is located inside the laminated, nonwoven fabric 142A and the smaller fibers of each of the layers 112B and 118B is on the outside surfaces of the laminated, nonwoven fabric 142A. The laminated, nonwoven fabric 142A is wound onto a take-up winder 132.

It should be understood that the embodiments of FIGS. 3 and 4 are alternatives to the use of a spunbonded layer in the center of the laminated, nonwoven fabric illustrated in FIGS. 1 and 2. If such alternatives embodiments are used, the materials should have large diameter fibers, which could range, for example, from about 20 microns to even as high as about 200 microns, and should be formed in such a way as to maximize the void volume of the center of the laminated, nonwoven fabric. With respect to the embodiments of FIGS. 1 and 2, examples of alternative center layer fabrics may be, but are not limited to, three dimensionally formed, hydroembossed spunlace, aperture spunlace (spunlace hydroembossed with open holes in the fabric), through air bonded high-loft nonwoven fabric made of biocomponent fibers, scrim netting, and thermoplastic foam.

Although the foregoing description of the present fabric and mechanism has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the mechanism as described herein may be made, none of which depart from the spirit or scope of the present disclosure. The particular embodiments and applications were chosen and described to provide the best illustration of the principles of the mechanism and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:
1. A process for making a laminated, nonwoven fabric having a fluid retention effectiveness and favorable fluid delivery uniformity characteristics, the process comprising:
   forming a first meltblown layer from extruded polymer fiber having a preselected fiber diameter range on a first forming wire assembly;

cooling the first meltblown layer to a temperature below a melting point of the first meltblown layer;

providing a spunbonded layer of fibers composed of a polymer having a preselected fiber diameter range larger than the fiber diameter range of the first meltblown layer;

cooling the spunbonded layer to a temperature below a melting point of the spunbonded layer;

forming a second meltblown layer from extruded polymer fiber having the preselected fiber diameter range of the first meltblown layer on a second forming wire assembly;

cooling the second meltblown layer to a temperature below a melting point of the second meltblown layer; and, after the cooling of said first and second meltblown layers and the cooling of said spunbonded layer, laminating the spunbonded layer between the first and second meltblown layers on a thermal calender apparatus to form a single laminated, nonwoven fabric.

2. The process for making a laminated, nonwoven fabric of claim 1, wherein the polymer used in the first and second meltblown layers and the spunbonded layer is the same.

3. The process for making a laminated, nonwoven fabric of claim 2, wherein the polymer comprises homopolymer polypropylene.

4. The process for making a laminated, nonwoven fabric of claim 1, further comprising forming a three-dimensional pattern on one surface of each of the first and second meltblown layers, wherein the surfaces having the three-dimensional pattern define outer surfaces of the laminated, nonwoven fabric.

5. The process for making a laminated, nonwoven fabric of claim 1, wherein the laminated, nonwoven fabric is configured to define a bond area in a range of one percent to fifty percent of a surface area of the laminated, nonwoven fabric.

6. The process for making a laminated, nonwoven fabric of claim 5, wherein the laminated, nonwoven fabric is configured to define a bond area in a range of five percent to twenty percent of the surface area of the laminated, nonwoven fabric.

7. The process for making a laminated, nonwoven fabric of claim 1, wherein the preselected fiber diameter range of the first and second meltblown layers is between about 0.5 microns to about 10.0 microns.

8. The process for making a laminated, nonwoven fabric of claim 7, wherein the preselected fiber diameter range of the first and second meltblown layers is between about 2.0 microns to about 5.0 microns.

* * * * *